Dec. 29, 1953    K. B. TRACE    2,664,031
METHOD OF GENERATING AND CUTTING GEARS
Filed May 26, 1947    5 Sheets-Sheet 1
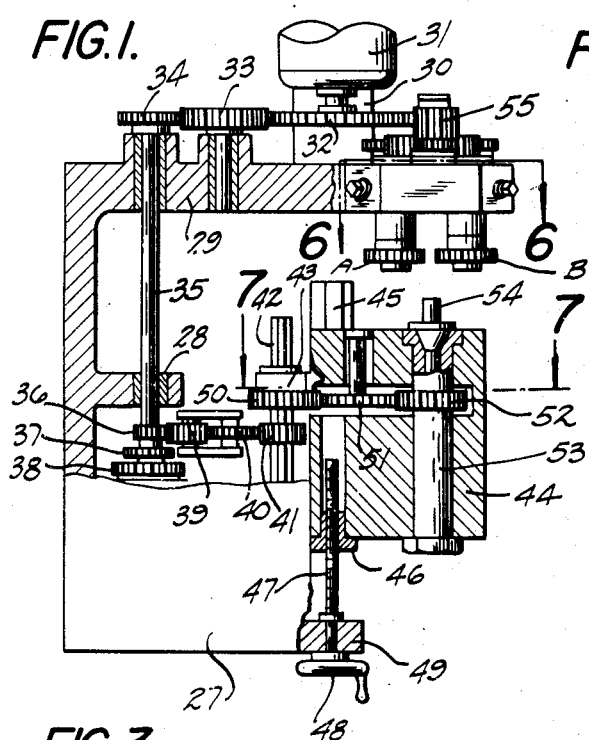
INVENTOR.
KEITH B. TRACE.
BY
Thos. Connelly
ATTORNEY.

Dec. 29, 1953     K. B. TRACE     2,664,031
METHOD OF GENERATING AND CUTTING GEARS
Filed May 26, 1947     5 Sheets-Sheet 2

INVENTOR.
KEITH B. TRACE.
BY
ATTORNEY.

Dec. 29, 1953 K. B. TRACE 2,664,031
METHOD OF GENERATING AND CUTTING GEARS
Filed May 26, 1947 5 Sheets-Sheet 3

INVENTOR.
KEITH B. TRACE.
BY
Thos S Donnelly
ATTORNEY.

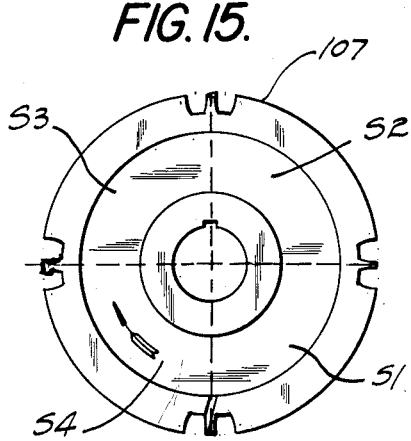
FIG. 15.
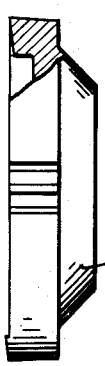
FIG. 16.
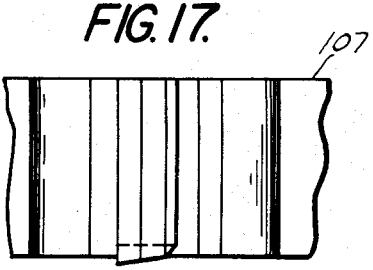
FIG. 17.
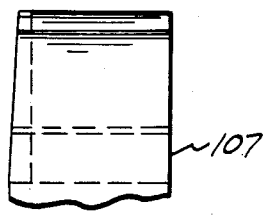
FIG. 19.
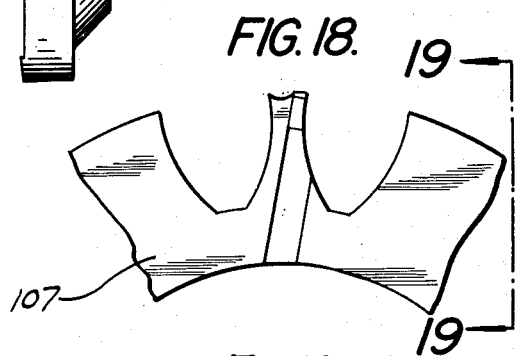
FIG. 18.
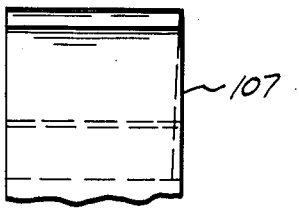
FIG. 20.
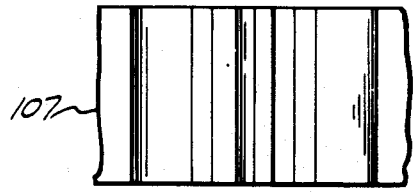
FIG. 21.
FIG. 22.
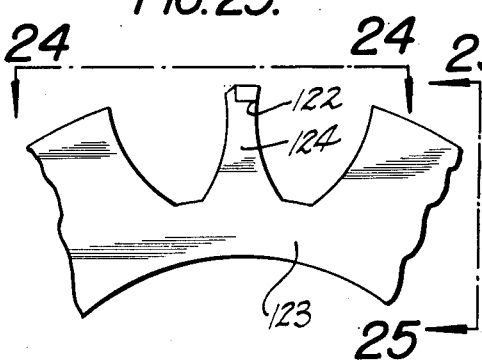
FIG. 23.
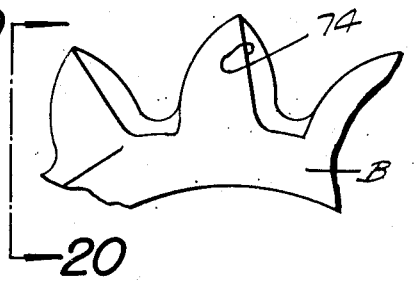
INVENTOR.
KEITH B. TRACE.
BY
ATTORNEY.

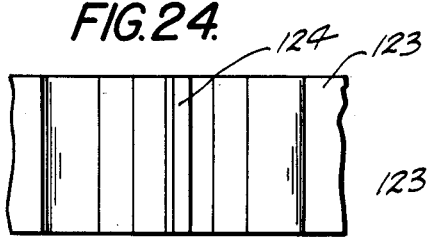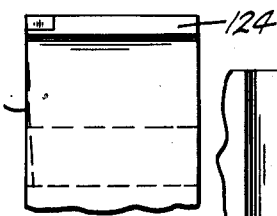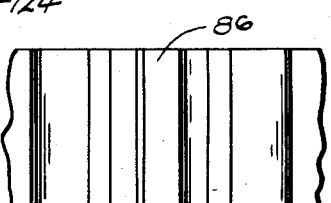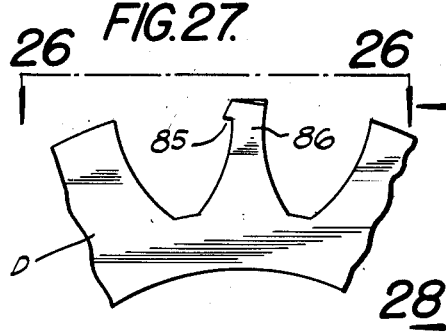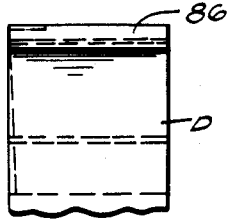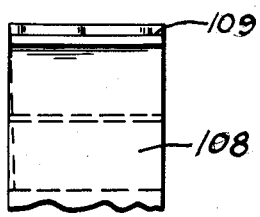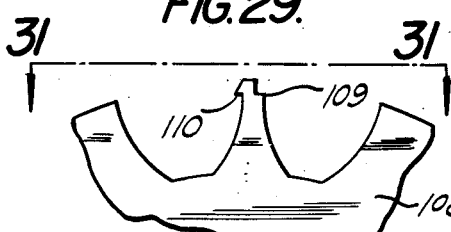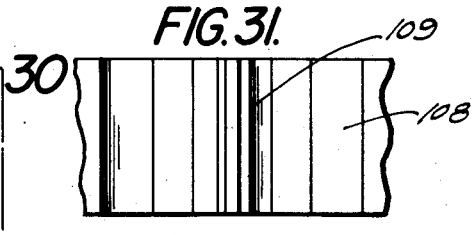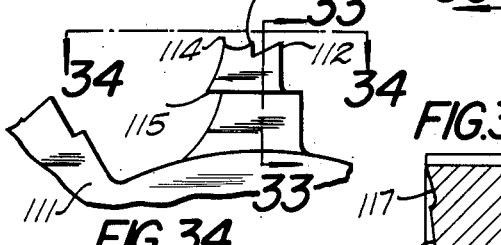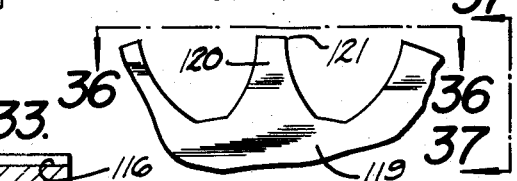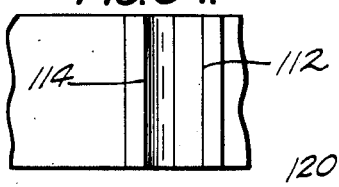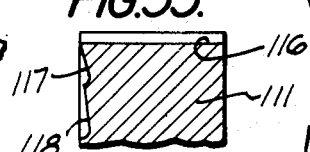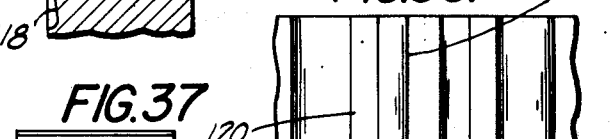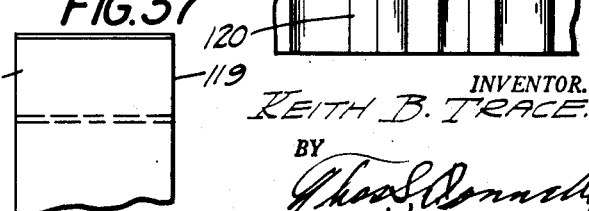

Patented Dec. 29, 1953

2,664,031

UNITED STATES PATENT OFFICE 2,664,031

METHOD OF GENERATING AND CUTTING GEARS

Keith B. Trace, Detroit, Mich.

Application May 26, 1947, Serial No. 750,443

4 Claims. (Cl. 90—3)

My invention relates to a new and useful improvement in a gear cutting method.

It is an object of the present invention to provide a gear cutting method whereby a cutting element is constantly rotated and the work-piece on which the gear teeth are to be cut is constantly rotated while the cutting element is in contact therewith. While there is a relative rotation of these parts, the cutting element will move aixally of the work-piece the desired length but there is no relative radial movement between the work-piece and the cutting element and it is an object to provide a method whereby these factors may be present while the gear cutting is being performed.

Another object of the invention is the provision of a method of cutting gears whereby a plurality of cutting elements will successively operate upon the work-piece, the first operation being the cutting of a cavity of the proper depth, and the second operation the cutting of the cavity of the proper width. A third operation consists in forming and finishing the involute on one side of the cavity, and the fourth operation consists in forming and finishing the involute on the opposite side of the cavity. These operations may be performed by the use of four cutting elements having cutting teeth adapted to perform the four operations referred to, but it is an object of the present invention to also provide an arrangement whereby a single rotatable cutting element may have cutting teeth thereon divided into segments, one of the segments being provided with cutting teeth to perform operation Number 1, another segment with cutting teeth to perform operation Number 2, another segment with cutting teeth to perform operation Number 3, and another segment with cutting teeth to perform operation Number 4.

It is an object to provide a method of cutting gears with a constant rotation of the work-piece and the cutter whereby a very small stock may be used from which to cut the gears and this is particularly effective when a cutter divided into segments, as mentioned, is used.

Another object of the invention is the provision of a method whereby the teeth on the gear may be formed and whereby the cutters, which co-operate to cut the teeth, may be adjusted, thus compensating for any slight variations in the dimensions of the cutting elements.

Other objects will appear hereinafter.

It is recognized that various modifications and changes may be made in the details herein set forth and it is intended that such shall be embraced within the scope of the claims which form a part hereof.

Forming a part of this specification are drawings in which,

Fig. 1 is a central, vertical, sectional view of a machine used for carrying out the method showing parts broken away and parts in side elevation, Fig. 2 is a front elevational view of the machine used, Fig. 3 is a top plan view in fragment, Fig. 4 is an enlarged fragmentary, elevational view showing the arrangment of the cutting element, Fig. 5 is an enlarged sectional view taken on line 5—5 of Fig. 3, Fig. 6 is a fragmentary, sectional view taken on line 6—6 of Fig. 1, Fig. 7 is a fragmentary, slightly enlarged sectional view taken on line 7—7 of Fig. 1, Fig. 8 is a fragmentary, elevational view showing the first step in the cutting operation, Fig. 9 is a fragmentary, elevational view showing the second step in the cutting operation, Fig. 10 is a fragmentary, elevational view showing the third step in the cutting operation, Fig. 11 is a fragmentary view showing the fourth step in the cutting operation, Fig. 12 is an end elevational view of a workpiece showing a cavity formed by the first operation, Fig. 13 is an end elevational view of a workpiece showing the cavity after the second operation, Fig. 14 is a fragmentary, sectional view slightly enlarged taken on line 14—14 of Fig. 13, Fig. 15 is a plan view of a cutter having the cutting teeth arranged in four segments, Fig. 16 is a side elevational view of the cutter shown in Fig. 15, Fig. 17 is a slightly enlarged peripheral, fragmentary view of a segment of the cutter shown in Fig. 15, Fig. 18 is a slightly enlarged fragmentary, side elevational view of a segment shown in Fig. 15, Fig. 19 is a fragmentary view taken on line 19—19 of Fig. 18, Fig. 20 is a fragmentary, side elevational view of that portion of the cutter shown in Fig. 15 which embodies the cutting element No. 2, illustrated in fragment, Fig. 21 is a fragmentary plan view of that portion of the cutting element shown in Fig. 15 which embodies the cutting element No. 2, Fig. 22 is an enlarged, fragmentary, side elevational view of that portion of the cutter which embodies the cutting teeth for operation No. 2, Fig. 23 is a fragmentary, side elevational view of that portion of the cutter which embodies the cutting element No. 3 slightly enlarged, Fig. 24 is a view taken on line 24—24 of Fig. 23, Fig. 25 is a view taken on line 25—25 of Fig. 23, Fig. 26 is a view taken on line 26—26 of Fig. 27, Fig. 27 is a fragmentary, enlarged, side elevational view of that portion of the disc embodying the cutting element No. 4, Fig. 28 is a view taken on line 28—28 of Fig. 27, Fig. 29 is an enlarged, side elevational, fragmentary view of a cutter showing a slight modification, Fig. 30 is a fragmentary view taken on line 30—30 of Fig. 29, Fig. 31 is a fragmentary view taken on line 31—31 of Fig. 29, Fig. 32 is a fragmentary, side elevational view of a cutter showing a further modification, Fig. 33 is a fragmentary, sectional view taken on line 33—33 of Fig. 32, Fig. 34 is a fragmentary view taken on line 34—34 of Fig. 32.

Fig. 35 is a fragmentary, side elevational view of a cutter showing a further modification, Fig. 36 is a view taken on line 36—36 of Fig. 35.

Fig. 37 is a view taken on line 37—37 of Fig. 35.

Figure 4:
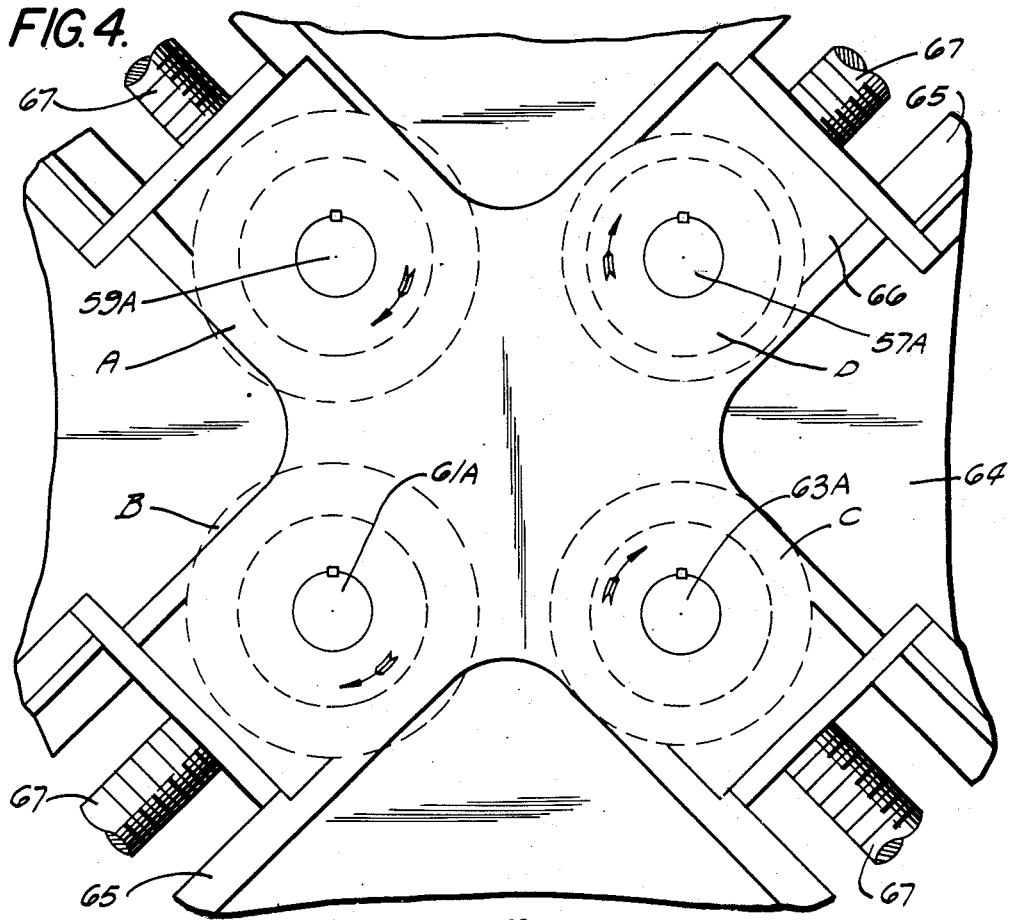
Figure 5:
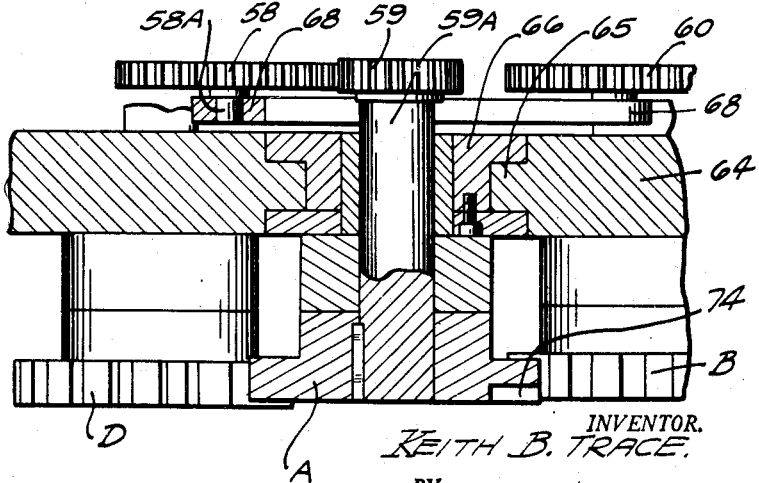
Figure 8:
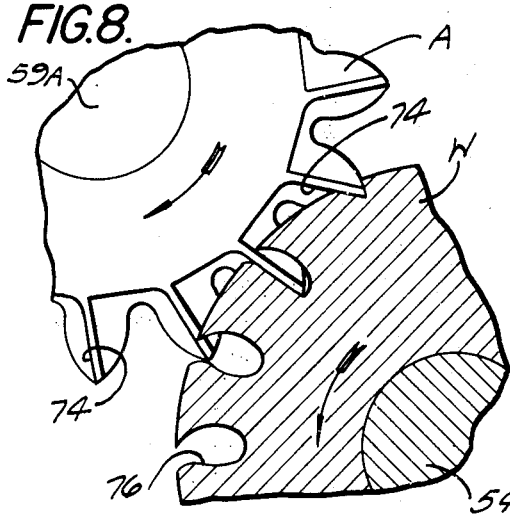
Figure 11:
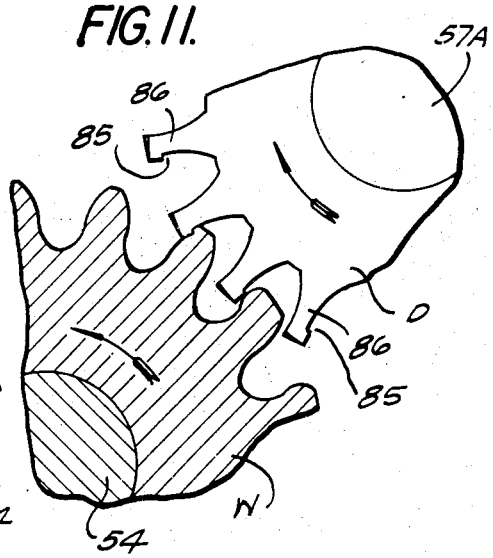
Figure 9:
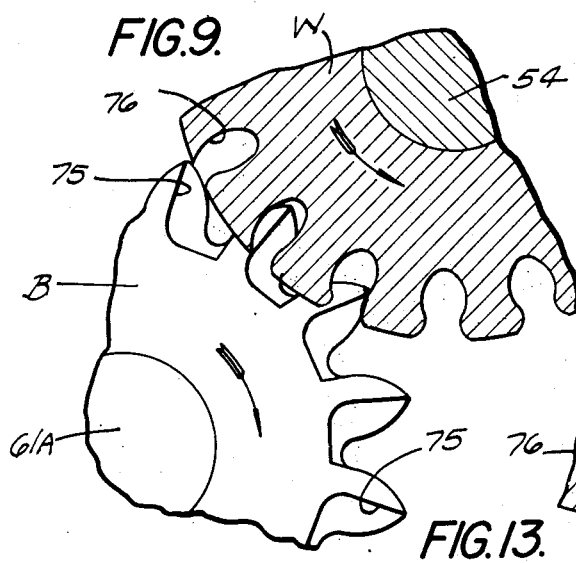

In the drawings I have illustrated as an example a machine which is capable of performing the operation so that the gears are cut according to the method referred to herein. In this machine I have illustrated a body 27 having the bearing 28 projecting inwardly from one portion thereof and provided with the overlying supporting portion 29. Projecting upwardly from this portion 29 is a standard 30 which serves as the support for the electric motor 31 which serves to drive the pinion 32. This pinion is in mesh with the idler 33 which in turn meshes with the gear 34 fixedly mounted upon the shaft 35. Fixedly mounted on this shaft 35 is a plurality of gears 36, 37 and 38 so that the speed of rotation of the driven parts may be controlled. The transmission in itself forms no part of the present invention and is not illustrated in detail. Meshing with the gear 36 is an idler 39 with which meshes an idler 40 which in turn meshes with the gear 41 slidably mounted on the shaft 42 and adapted for rotating in unison therewith. The yoke 43 projects outwardly from the slidable support 44 which is slidably mounted on the standards or guide rails 45 which project upwardly from the body 27. Secured to this body 44 is a nut 46 in which is threaded a screw 47 which projects through and is adapted to rotate relatively to the lug 49 projecting outwardly from the body 27. The screw 47 is provided with a hand wheel 48 whereby it may be rotated and as illustrated in Fig. 1, this screw 47 is fixed axially relatively to the lug 49. Slidably mounted on the shaft 42 and rotating in unison therewith is the gear 50, the yoke 43 carrying the gear 50 longitudinally of the shaft 42 when the screw 47 is rotated to move the supporting head 44. This gear meshes with the idler gear 51 which in turn meshes with the gear 52 fixedly mounted on the shaft 53. This shaft 53 carries a suitable column 54 on which the work-piece is positioned so that when the shaft 53 is rotated the work-piece retained by the column is also rotated.

The gear 32 meshes with the gear 55. Meshing with the gear 55 is the idler gear 56 which also meshes with the gear 57 the gear 56 being mounted on the shaft 59A and the gear 57 being mounted on the shaft 57A shown in Fig. 6. The gear 55 also meshes with the gear 58 mounted on the shaft 58A and this gear 58 meshes with the cutter gear 59 mounted on the shaft 59A. The gear 55 meshes with the gear 60 mounted on the shaft 60A and this gear 60 in turn meshes with the gear 61 fixedly mounted on the shaft 61A. The gear 55 meshes with the gear 62 mounted on the shaft 62A and the gear 62 meshes with the gear 63 which is fixedly mounted on the shaft 63A. Supported by the portion 29 is the head 64 on which is mounted the plurality of slides, one of these slides being provided for each of the shafts 57A, 59A, 61A and 63A. They are similarly constructed and operate similarly so that a description of one will suffice as a description for all. Slidably mounted on the slide is a carriage 65 in which the shaft 63A is journaled, and connected to the carriage 66 is a screw 67 so that upon a rotating of the screw 67, the carriage 66 may be moved inwardly and outwardly on the slide 65. This is to provide means for adjusting the apparatus to cut gears of different sizes. Each of the shafts 56A, 58A, 60A and 62A projects through one of the radiating arms 68 which may be keyed to the shaft 69 at various positions of rotation so that when the shafts 63A, 57A, etc., are moved outwardly, the gears 56, 58, 60 and 62 will be swung on the shaft 69 as an axis so that they remain in mesh with the gears 63, 61, 59 or 57 as the case may be. Thus, it becomes possible to space the shafts 57A, 59A, 61A and 63A farther apart and yet maintain the necessary meshing of the gears for driving these shafts. Mounted on the lower end and rotated by each of the shafts 57A, 59A, 61A and 63A is a cutter, cutter A, cutter B, cutter C, and cutter D being designated in the order of their operation so that cutter A may be said to be cutter No. 1, cutter B cutter No. 2, cutter C cutter No. 3, and cutter D cutter No. 4. In Figs. 8, 9, 10 and 11, I have designated the work-piece or blank from which the gear is to be cut by the numeral W. The teeth of the various cutters are differently formed to perform their different operations and a description of the cutting operation will now proceed.

Figure 12:
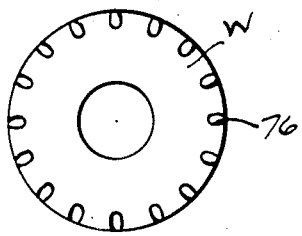
Figure 14:
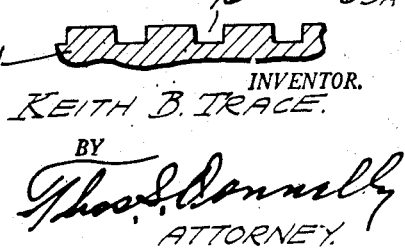

The teeth on the cutter A are cut away as at 74 on the advancing edge or face. The outer edge of this cut away portion effects the cutting. While the teeth are located diametrically opposite each other, the cutting face or the face 74 on which the cutting edge is present does not extend diametrically but is inclined at an angle as clearly appears in Fig. 8. When the work-piece is positioned on the retainer 54, the support 44 may be moved upwardly so as to move the work-piece into engagement with the cutters positioned above as the face of the work-piece is engaged by the cutters the operation is as shown in Fig. 8, Fig. 9, Fig. 10, and Fig. 11. As the teeth of the cutter A enter the work-piece a recess 76 is formed in the advancing face of the work-piece the formation of these recesses being clearly shown in Fig. 8 and Fig. 12. It will be noted that the cutting is a continuous one and that the advancing edge is cutting the material directly ahead of it. Cutter A is, of course, rotating in the direction indicated by the arrow and the work-piece W is rotating continuously in the direction indicated by the arrow on it. Cutter No. 1 is positioned slightly or approximately five thousandths of an inch axially ahead of cutter B and cutter B is slightly or approximately five thousandths of an inch axially ahead of cutter C. Cutter A is used to cut the depth and cutter B is used to cut to the proper width.

The teeth on cutter B are cut away as at 75 to provide an advancing face and the edge of this advancing face is the portion which does the cutting. As the tooth of cutter B enters the recess 75 formed by cutter A, the tooth of cutter B will cut to widen the recess 76 so as to cut to the proper width.

Figure 10:
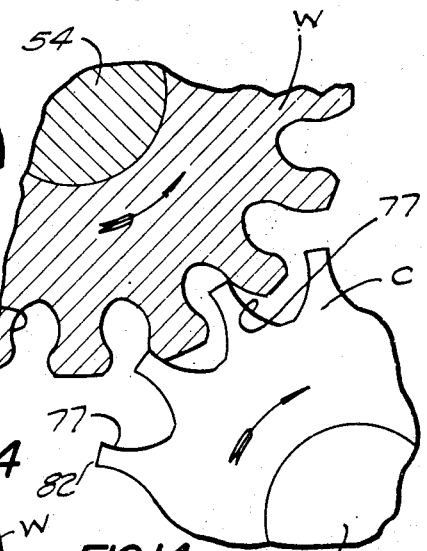
Figure 13:
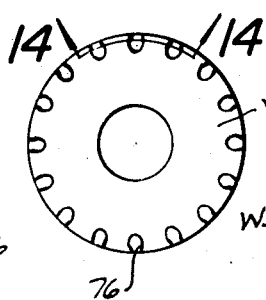

The teeth of cutter C have a cutting edge which is the outer edge of the face 77. These teeth, in entering the cavity, do the cutting on a pushing operation to form the involute and to finish the involute. As shown in Fig. 10, when the tooth enters the cavity or recess 76, the edge of the facing 77 effects a cutting operation at its juncture with the outer face 82 and this cutting operation continues on one face of the cavity so that the involute on one side of the recess or cavity is formed and finished. Consequently, the cutting operation of the teeth of cutter C is the cutting operation effected in a pushing manner as the cutting tooth is moving into the recess or cavity. In cutter D, the cutting tooth does not effect any cutting operation while moving into the cavity but begins its cutting operation as it travels on its outward movement. The tooth 36 is cut away, as at 85, to provide a cutting edge on the end of the hook thus formed which serves to engage and cut away the opposite side of the cavity or recess to form and finish the involute at the opposite side so that there is no pre-forming of the involute and then another step for finishing the involute.

It will be noted that all of the cutters are constantly rotating and that the work-piece is constantly rotating and also that the cutters are constantly in contact with the work-piece. There is no movement radially inwardly and outwardly from the work-piece in order to effect the cutting. Moreover, it will be noted that the cutters are moved axially and travel merely the length of the teeth.

This makes it possible to cut a gear which is concentric with its bore inasmuch as the work-piece rotates on its own axis as it is being cut. It will be noted also that there is no indexing and that there is a constant feed of the work-piece into the cutting members. Experience has shown that this method of cutting a gear is one which renders the gear truer to size and concentric, while at the same time, the gear cutting may be easily and quickly effected reducing the labor cost considerably.

It is believed obvious that while I have illustrated a mechanism for cutting the gears in which the four cutters are mounted on a single machine that the method of using the successive cutters for cutting successive parts of the tooth need not require a machine such as illustrated and that the method may be followed and carried out with other types of construction.

Experience has shown that under certain circumstances, in cutting gears with the method herein set forth, it is impracticable to use four sets of cutters as illustrated, for example, in Fig. 3. Particularly is this the case where the gear to be cut is a very small gear. Where the gear to be cut is a small gear, it may be desirable to dispense with two of the cutters illustrated in Fig. 3 and perform the operation with a pair of cutters. This may be carried further and the operation may be carried on with a single cutter. In Fig. 15, I have illustrated a cutting wheel 107 divided into four segments, each segment being indicated into four segments, segment S1, segment S2, segment S3, and segment S4. Each of these segments is provided with teeth which appear on cutter A of Fig. 8 and which are adapted to perform the first operation, namely, the cutting of the depth of the cavity. The teeth on segment S2 are the teeth which are illustrated on cutter B shown in Fig. 9 which are adapted to perform the second operation, namely, the forming of the cavity to the proper width. The teeth on segment S3 are the teeth shown on cutter C in Fig. 10 and the teeth on S4 are the teeth shown on cutter D in Fig. 11. It is obvious that when the cutter is brought into engagement with the work-piece and rotated in the direction indicated by the arrow on Fig. 15 that the various segments will successively be brought into engagement with the work-piece, each segment traveling around the periphery of the work-piece before the successive segment engages. In using a cutter such as shown in Fig. 15, the relative rotation of the cutter and the work-piece will, of course, have to bear a certain proportion. Where four segments are used, such as shown in Fig. 15, the work-piece would have to rotate at least four times as fast as the cutter for most efficient operation. It is believed obvious that any number of the cutter, shown in Fig. 15, might be used in a gear-forming operation and, if desired, all four of the cutters which are shown in Fig. 4 might be constructed as is the cutter shown in Fig. 15. However, I prefer, when using the four cutters, to form each cutter with one kind of cutting tooth so that the cutter itself will perform a single operation. When using the cutter shown in Fig. 15, the teeth on segment 1 will perform the first operation, the teeth on segment 2 the second, and the teeth on the segments 3 and 4 will perform the third and fourth operations. It is believed obvious that the location of the teeth on segments 3 and 4 may be alternated as the operation performed by the teeth on segment 4 might precede the operation of the teeth on segment 3.

It is believed obvious from a description of Fig. 15 that the cutter may be provided with any desired arrangement of the cutting elements or teeth. For instance, a gear could be successfully cut using a pair of cutters, one of the cutters having the cutting elements 1 and 2, and the other cutter having the cutting elements 3 and 4. In this instance, the cutters would be used in pairs or multiple pairs. Again, a cutter might be used having the cutting elements 1 and 2 co-operating with a cutter having the cutting elements 3 and 4 used in pairs or multiple pairs. The operation might also be performed with the cutter having the cutting elements 1 and 3 and the cutting elements 2 and 4 used in pairs or multiple pairs.

In Fig. 29, I have illustrated the cutter 108 having the cutting edges 109 and 110 formed on the teeth. This cutting edge 109 is the cutting edge found on cutter No. 3 and cutting edge 110 is the cutting edge found on cutter No. 4 so that this cutter 108 is combining on each tooth the cutting edges so that the tooth will perform operation No. 3 and operation No. 4.

In Fig. 32, I have indicated a cutter 111 having the cutting edges 112, 113, 114, and 115 formed thereon, the cutting edge 112 being No. 1 cutting edge and adapted for performing the first operation, the cutting edge 114 being cutting edge No. 2 adapted for performing operation No. 2, cutting edge 113 being the cutting edge No. 3 adapted to perform operation No. 3 and cutting edge 115 being the cutting edge No. 4 adapted to perform operation No. 4. Consequently, with a cutter of this type, each tooth embodies all four cutting elements so that each tooth will perform the four operations. As shown clearly in Fig. 33, these cutting edges are formed by cutting back the face of the cutter 111, as at 116, 117 and 118. This cutting back also provides clearance for such chips as may be encountered or formed.

In Fig. 35, I have shown a slight modification embodying the cutter 119 having the teeth 120 provided with a cutting edge 121 corresponding to the cutter edge of the cutter No. 3 which is illustrated in Fig. 23. The cutting edge 122 on the cutter 123, illustrated in Fig. 23, is cut back from the periphery of the tooth 124. In the form shown in Fig. 35, this cutting back is eliminated as the teeth themselves are cut back so that the periphery thereof is moved radially inwardly to provide the necessary radial distance for cutting operations.

It is, consequently, seen that I have provided a method of cutting gears whereby the four steps of cutting the cavity to depth, widening it to width and then forming and finishing the involute on opposite sides of the tooth or cavity may be accomplished by a rotating cutter rotating while the work-piece is being rotated and that various combinations of cutters may be provided for cutting work-pieces of very small sizes or very large sizes.

The direction of rotation of the cutter and the workpiece is indicated by the arrows shown in Fig. 8, Fig. 9, Fig. 10, and Fig. 11, and it will be noted that the cutter rotates in the opposite direction to the direction of the work-piece.

From the description given, it is believed obvious that instead of forming a cutter comprising segments, each segment having a number of specified cutting teeth such as illustrated in Fig. 15, a cutter could be made having the cutting teeth formed thereon succeeding each other numerically, each tooth being in sequence so that the cutting teeth 1, 2, 3 and 4 would follow each other in sequence on the cutter, or a cutter could be made having the teeth 1 and 2 following each other with the combination tooth following having the cutting edges or cutters 3 and 4.

What I claim is:

1. The method of cutting a gear consisting in rotating a solid unworked-upon blank from which the gear is to be formed on its own axis, feeding the marginal face of said blank into the teeth of a cutting element rotating in the direction opposite to the direction of rotation of said blank for forming recesses of proper depth in the marginal portion of the blank and then bringing said recesses into engagement with the teeth of a cutter rotating in a direction opposite to the direction of rotation of said blank for cutting said recesses to a proper width and then bringing one side of each of said recesses into contact with the teeth of a cutting element rotating in a direction opposite to the direction of rotation of said blank for establishing and finishing on one side the involute and then bringing the opposite side of said recess into engagement with a cutting tooth of another rotating cutter rotating in a direction opposite to the direction of rotation of said blank for cutting and finishing the involute on the opposite side of said recess.

2. A method of cutting a gear consisting in feeding a solid unworked-upon blank from which a gear is to be formed so as to engage the marginal face thereof adjacent the marginal edges with the teeth of a cutter element rotating on its axis for forming cavities of proper depth in the marginal portion of the blank and then bringing said cavities into engagement with the teeth of a second cutter rotating on its axis for cutting said recesses to proper width and then bringing opposite sides of said cavity successively into engagement with separate cutting elements for forming on said sides the involute and finishing the same.

3. The method of cutting a gear consisting in rotating a solid unworked-upon work-piece on its axis in one direction and subjecting the peripheral margin of said work-piece to the action of cutters rotating in the opposite direction and provided with teeth for cutting a recess of a proper depth in the face of the work-piece and teeth for cutting said recess to a proper width and two sets of separate teeth for successively cutting opposite sides of said recess to the shape and finish of the involute of the tooth required.

4. The method of cutting from a solid cylindrical blank a cylindrical gear of the spur or helical type in which the tooth space runs generally longitudinally and out of one end of the cylinder comprising: rotating said blank, feeding the end of the rotating blank into a cutting element rotating in the opposite direction for cutting a cavity of the depth of a tooth space, and then contacting said end with a cutting element rotating in said opposite direction for cutting the cavity to the proper width of a tooth space, and then contacting said end with a cutting element rotating in said opposite direction for forming and finishing an involute on one side of said cavity, and then contacting said end with a cutting element rotating in said opposite direction for forming and finishing the involute on the opposite side of the cavity.

KEITH B. TRACE.

References Cited in the file of this patent

UNITED STATES PATENTS

| Number | Name | Date |
| --- | --- | --- |
| 616,648 | Beale | Dec. 27, 1898 |
| 1,642,179 | Schurr | Sept. 13, 1927 |
| 1,680,258 | Schurr | Aug. 7, 1928 |
| 1,833,993 | Hill | Dec. 1, 1931 |
| 2,324,003 | Kitchen et al. | July 13, 1943 |

FOREIGN PATENTS

| Number | Country | Date |
| --- | --- | --- |
| 399,602 | Great Britain | Oct. 12, 1933 |